(12) United States Patent
Ren et al.

(10) Patent No.: US 9,876,520 B2
(45) Date of Patent: Jan. 23, 2018

(54) COMMUNICATION CHIP INTEGRATED WITH SIM CARD

(71) Applicant: China Mobile Communications Corporation, Beijing (CN)

(72) Inventors: Xiaodong Ren, Beijing (CN); Guangna Lv, Beijing (CN); Hongmei Wang, Beijing (CN); Yue Liu, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 0 days.

(21) Appl. No.: 15/023,997

(22) PCT Filed: Dec. 3, 2014

(86) PCT No.: PCT/CN2014/092938
§ 371 (c)(1),
(2) Date: Mar. 22, 2016

(87) PCT Pub. No.: WO2015/085884
PCT Pub. Date: Jun. 18, 2015

(65) Prior Publication Data
US 2016/0248463 A1    Aug. 25, 2016

(30) Foreign Application Priority Data

Dec. 13, 2013    (CN) .......................... 2013 1 0684902

(51) Int. Cl.
*G06K 19/077* (2006.01)
*H04W 12/08* (2009.01)
(Continued)

(52) U.S. Cl.
CPC ......... *H04B 1/3816* (2013.01); *G06K 19/077* (2013.01); *H04M 1/26* (2013.01);
(Continued)

(58) Field of Classification Search
CPC ....... G06K 19/077; H04W 12/08; H04M 1/26
See application file for complete search history.

(56) References Cited

U.S. PATENT DOCUMENTS

| 2009/0275364 A1 | 11/2009 | Morel et al. |
| 2010/0090805 A1 | 4/2010 | Libotte |

(Continued)

FOREIGN PATENT DOCUMENTS

| CN | 1856138 A | 11/2006 |
| CN | 101222711 A | 7/2008 |

(Continued)

OTHER PUBLICATIONS

Korean Office Action for Korean Patent Application No. 10-2016-7002484, 6 pages.
(Continued)

*Primary Examiner* — Asghar Bilgrami
(74) *Attorney, Agent, or Firm* — Morgan, Lewis & Bockius LLP

(57) ABSTRACT

The present publication discloses a communication chip integrated with a SIM card, comprising: a baseband CPU, a first protocol interface, selector switch, and a SIMZone unit; said baseband CPU being connected to the first protocol interface; said selector switch being connected to the SIM-Zone unit, the first protocol interface, and an IF1 interface. The selector switch and said SIMZone unit are always in a state of communication with each other, and when said selector switch is in a state of communication with said first protocol interface, said SIMZone unit is used for providing SIM card functionality to said baseband CPU; when said selector switch is in a state of communication with said IF1 interface, said SIMZone unit is used for receiving data written by means of said IF1 interface. In the embodiments of the present publication, by means of integrating a SIM card in the communication chip of a terminal equipment, the area occupied by the SIM card on the PCB of the terminal equipment is reduced, the SIM card is prevented from
(Continued)

serving as an independent hardware entity, the swapping process is avoided, and reliability and security are increased, security being not lower than that of a conventional SIM card.

9 Claims, 1 Drawing Sheet

(51) Int. Cl.
    *H04M 1/26*     (2006.01)
    *H04B 1/3816*     (2015.01)
    *H04M 1/02*     (2006.01)

(52) U.S. Cl.
    CPC .......... *H04W 12/08* (2013.01); *H04M 1/0277* (2013.01); *H04M 2250/14* (2013.01)

(56) References Cited

U.S. PATENT DOCUMENTS

2012/0292395 A1* 11/2012 Huang ............. G06K 19/07733
                                                            235/492

2015/0181394 A1* 6/2015 Zuniga ................ H04W 72/005
                                                            370/312

FOREIGN PATENT DOCUMENTS

| CN | 101473336 A | 7/2009 |
| --- | --- | --- |
| CN | 101714221 A | 5/2010 |
| CN | 202197332 U | 4/2012 |
| CN | 103369721 A | 10/2013 |
| EP | 2 290 589 A1 | 3/2011 |

OTHER PUBLICATIONS

Chinese First Office Action dated Aug. 25, 2017, for CN Application No. 201310684902.7, 16 pages.

Extended European Search Report dated Jul. 5, 2017, for EP Application No. 14869640.4, 8 pages.

International Search Report dated Feb. 3, 2015, for International Patent Application No. PCT/CN2014/092938, 2 pages.

* cited by examiner

COMMUNICATION CHIP INTEGRATED WITH SIM CARD

CROSS-REFERENCE TO RELATED APPLICATION

The present application is the U.S. National Phase of International Application No. PCT/CN2014/092938 filed on Dec. 3, 2014, which claims priority of Chinese patent application No. 201310684902.7 filed on Dec. 13, 2013, the disclosure of which is incorporated herein by reference in its entirety.

TECHNICAL FIELD

The present disclosure relates to the field of communication technology, in particular to a communication chip integrated with a Subscriber Identity Module (SIM) card.

BACKGROUND

In the related art, an SIM card is usually present in a terminal equipment as a separate hardware entity. As shown in FIG. 1, which is a schematic diagram of a terminal equipment, the terminal equipment includes a communication chip and an SIM card. The communication chip is in communication with the SIM card through an ISO7816 (smart card international standard) interface, so as to achieve SIM-related functions desired for a Global System for Mobile Communications (GSM) network and/or a General Packet Radio Service (GPRS) network.

A certain area, and probably a large area, of a Printed Circuit Board (PCB) for the terminal equipment may be occupied by the SIM card. In addition, during the plug of the SIM card as a separate hardware entity, such failures as imperfect contact and metal chip breakage may occur, and then the reliability and security is deteriorated.

SUMMARY

One embodiment of the present disclosure provides a communication chip integrated with a SIM card, so as to prevent a certain area of a PCB for a terminal equipment from being occupied by the SIM card, and prevent the use of the SIM card as a separate hardware entity.

In order to achieve the object, the present disclosure provides in one embodiment a communication chip integrated with a SIM card. The communication chip includes a baseband central processing unit (CPU), a first protocol interface, a selector switch and a SIMZone unit. The baseband CPU is connected to the first protocol interface. The selector switch is connected to the SIMZone unit, the first protocol interface, and an IF1 interface, respectively. The selector switch is in a state of communication with the SIMZone unit all the time; when the selector switch is in a state of communication with the first protocol interface, the SIMZone unit is configured to provide an SIM card functionality for the baseband CPU; when the selector switch is in a state of communication with the IF1 interface, the SIMZone unit is configured to receive data written from the IF1 interface.

For example, when the IF1 interface is connected to a device of a specified type, the selector switch is in a state of communication with the IF1 interface, and the selector switch is not in a state of communication with the first protocol interface; when the IF1 interface is not connected to the device of the specified type, the selector switch is in a state of communication with the first protocol interface, and the selector switch is not in a state of communication with the IF1 interface.

For example, the device of the specified type is a chip operating system (COS) programmer or a personalization data writing device.

For example, the SIMZone unit includes a random access memory (RAM), a COS storage unit, a micro-control unit (MCU), a second protocol interface and a personalization data storage unit; the RAM, the COS storage unit, the second protocol interface and the personalization data storage unit are connected to the MCU, respectively; the SIMZone unit is connected to the selector switch through the second protocol interface; the RAM is configured to store temporary data for running of the COS on the MCU; the COS storage unit is configured to store program codes of the COS; the MCU is configured to run the COS; the second protocol interface is configured to provide a communication function which enables the SIMZone unit to be in communication with the baseband CPU and a programming function which enables the programming of the COS storage unit and the writing of personalization data into the personalization data storage unit through the IF1 interface; and the personalization data storage unit is configured to store the personalization data.

For example, in a second-generation (2G) network, the personalization data includes one of International Mobile Subscriber Identity (IMSI), Integrate Circuit Card Identity (ICCID), personal identity numbers (PIN1, PIN2), PIN Unlocking Keys (PUK1, PUK2), Key Identifier (KI) and Short Message Service Platform (SMSP), or a combination thereof; and in a third-generation (3G) network, the personalization data includes one of IMSI, ICCID, PIN1, PIN2, PUK1, PUK2, key (K), Operator Key (OPC) and SMSP, or a combination thereof.

For example, the first protocol interface is a protocol interface based on a smart card international standard ISO7816; and the second protocol interface is a protocol interface based on the smart card international standard ISO7816.

For example, the IF interface is a COS programming interface or a personalization data writing interface; when the IF1 interface is the COS programming interface, the second protocol interface is connected to the COS programmer through the COS programming interface, so as to enable the COS programmer to program the COS storage unit; and when the IF1 interface is the personalization data writing interface, the second protocol interface is connected to a personalization data writing device through the personalization data writing interface, so as to enable the personalization data writing device to write the personalization data into the personalization data storage unit.

For example, a hardware circuit of the IF1 interface includes a power supply (VCC), a grounded end (GND), a resetting end (RESET), a programming voltage (VPP), a clock (CLK) and a data input/output (I/O).

For example, the communication chip further includes a digital signal processor (DSP) and/or a communication chip peripheral interface.

At least one of the technical solutions provided in the embodiments of the present disclosure has following beneficial effects.

Comparing with the related art, one embodiment of the present disclosure has at least following advantages: in one embodiment of the present disclosure, the SIM card is integrated into the communication ship of the terminal equipment, and then an area occupied by the SIM card on the PCB of the terminal equipment is reduced and the SIM card is prevented from serving as a separate hardware entity, thereby avoiding the plugging of the SIM card and improving reliability and security. Since the SIM card is integrated into the communication chip, thus its security is not lower than that of a traditional SIM card.

BRIEF DESCRIPTION OF THE DRAWINGS

In order to illustrate the technical solutions of the present disclosure or the related art in a clearer manner, drawings desired for embodiments of the present disclosure will be described briefly hereinafter. Obviously, the following drawings merely relate some embodiments of the present disclosure, and based on these drawings, a person skilled in the art may obtain other drawings without any creative effort.

DETAILED DESCRIPTION

Implementation of the present disclosure will be further described below in conjunction with the accompanying drawings and embodiments. The following embodiments are merely used to illustrate the present disclosure, but not intended to limit the scope of the present disclosure.

In order to make the objects, the technical solutions and the advantages of the present disclosure more apparent, the technical solutions of the embodiments of the present disclosure will be described hereinafter in a clear and complete manner in conjunction with the drawings of the embodiments of the present disclosure. Obviously, the following embodiments are merely a part of, rather than all of, the embodiments of the present disclosure, and based on these embodiments, a person skilled in the art may, without any creative effort, obtain other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

The technical solutions of the present disclosure will be described hereinafter in a clear and complete manner in conjunction with the drawings of the present disclosure. Obviously, the following embodiments are merely a part of, rather than all of, the embodiments of the present disclosure, and based on these embodiments, a person skilled in the art may, without any creative effort, obtain other embodiments, which also fall within the scope of the present disclosure.

Figure 1:
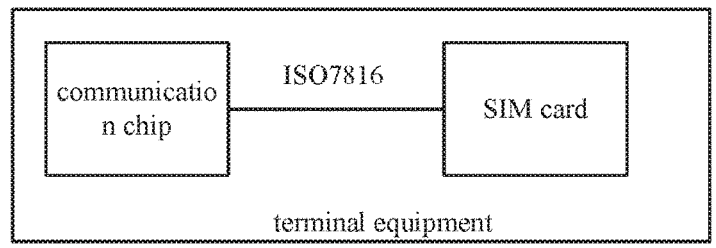
FIG. 1 is a schematic diagram of a terminal equipment in the related art.
Figure 2:
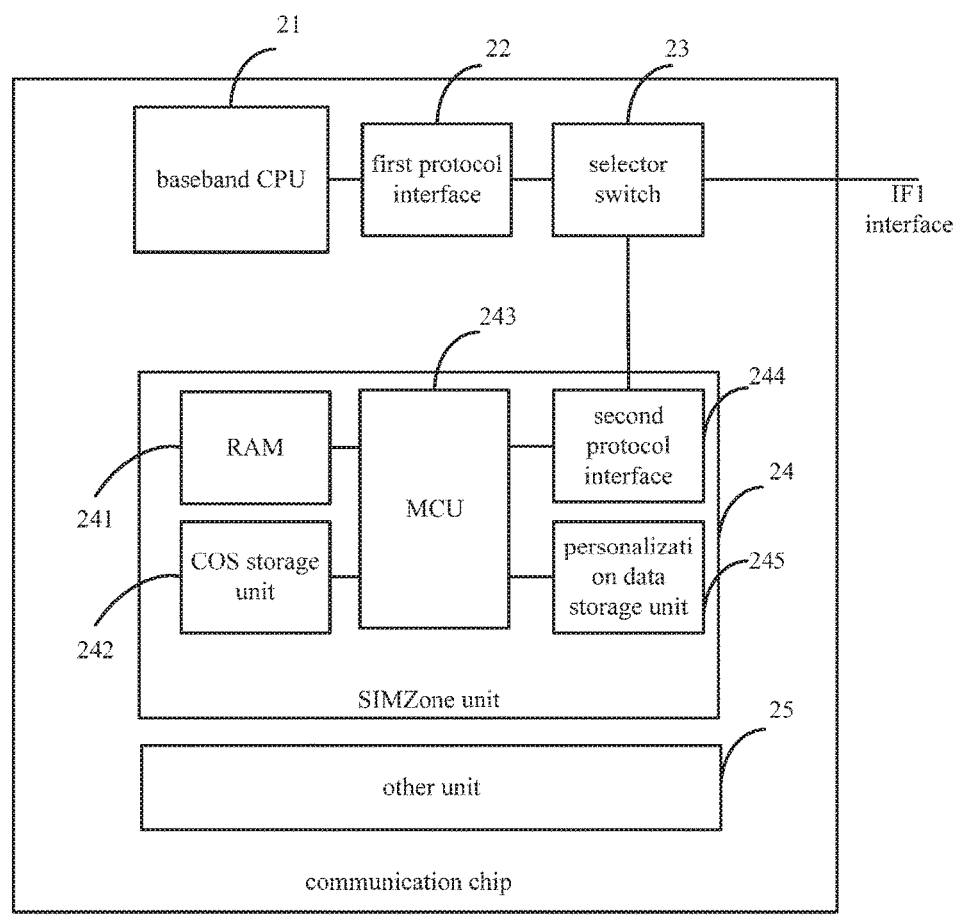
FIG. 2 is a schematic diagram of a communication chip integrated with a SIM card according to one embodiment of the present disclosure.

In order to solve the problems in the related art, the present disclosure provides in one embodiment a communication chip integrated with a SIM card. As shown in FIG. 2, the communication chip specifically includes a baseband center process unit (CPU) 21, a first protocol interface 22, a selector switch 23 and a SIMZone unit 24. The SIMZone unit 24 specifically refers to a subscriber identity module (SIM) zone unit 24.

In one embodiment of the present disclosure, the baseband CPU 21 is connected to the first protocol interface 22, and the selector switch 23 is connected to the SIMZone unit 24, the first protocol interface 22, and an IF1 interface, respectively. The selector switch 23 and the SIMZone unit 24 are always in a state of communication with each other. The selector switch 23 is in a state of communication with the first protocol interface 22 or the IF1 interface. Further, when the selector switch 23 is in a state of communication with the first protocol interface 22, the SIMZone unit 24 is configured to provide SIM card functionality for the baseband CPU 21; when the selector switch 23 is in a state of communication with the IF1 interface, the SIMZone unit 24 is configured to receive data written from the IF1 interface.

The first protocol interface 22 is a protocol interface based on ISO7816 and arranged in the communication chip.

in one embodiment of the present disclosure, when the IF1 interface is connected to a device of a specified type, the selector switch 23 is in a state of communication with the IF1 interface and the selector switch 23 is not in a state of communication with the first protocol interface 22. When the IF1 interface is not connected to the device of the specified type, the selector switch 23 is in a state of communication with the first protocol interface 22, and the selector switch 23 is not in a state of communication with the IF1 interface.

The device of the specified type may include, but not limited to, a chip operating system (COS) programmer or a personalization data writing device.

Based on the above, when the IF1 interface of the communication chip is connected to the COS programmer or the personalization data writing device, the selector switch 23 may determine that a current programming voltage VPP state of the IF1 interface is a high level by judging the VPP state of the IF1 interface, and at this point, the other end of the selector switch 23 is automatically switched to the IF1 interface, so as to enable the IF1 interface to communicate with the SIMZone unit 24, When the IF1 interface of the communication chip is not connected to the COS programmer or the personalization data writing device, the selector switch 23 may determine that the VPP state of the IF1 interface is a low level by judging the VPP state of the IF1 interface, and at this point, the other end of the selector switch 23 is automatically switched to the first protocol interface 22, so as to enable the first protocol interface 22 to communicate with the SIMZone unit 24.

In one example of one embodiment of the present disclosure, the communication chip may further include an other unit 25. The other unit 25 may include, but not limited to, a digital signal processor (DSP) and/or a communication chip peripheral interface. The functions of the other unit 25 will not be particularly defined herein.

In one embodiment of the present disclosure, the SIMZone unit 24 specifically includes a random access memory (RAM) 241, a COS storage unit 242, a micro control unit (MCU) 243, a second protocol interface 244 and a personalization data storage unit 245. The RAM 241 is connected to the MCU 243. The COS storage unit 242 is connected to the MCU 243. The second protocol interface 244 is connected to the MCU 243, The personalization data storage unit 245 is connected to the MCU 243. Further, the SIMZone unit 24 is connected to the selector switch 23 via the second protocol interface 244.

In one embodiment of the present disclosure, the RAM 241 is configured to store temporary data desired for the running of the COS on the MCU 243. The COS storage unit 242 is configured to store program codes of the COS. The MCU 243 is configured to run the COS. The second protocol interface 244, as a unique interface of the SIMZone unit 24 to the outside, is configured to provide a communication function (e.g., that as defined in ISO7816) and a programming function. The communication function enables the SIMZone unit 24 to be in communication with the baseband CPU 21. The programming function enables the programming of the COS storage unit 242 and the writing of personalization data into the personalization data storage unit 245 through the IF1 interface. The personalization data storage unit 245 is configured to store the personalization data.

The second protocol interface 244 is a protocol interface based on ISO7816. Further, in a 2G network, the personalization data may include, but not limited to, International Mobile Subscriber Identification Number (IMSI), Integrate Circuit Cad Identity (ICCID), Personal Identification Number 1 (PIN1), PIN2, PIN Unblocking Key 1 (PUK1), PUK2, Key identifier (KI) and Short message service platform (SMSP), or a combination thereof. In a 3G network, the personalization data may include, but not limited to, IMSI, ICCID, PIN1, PIN2, PUK1, PUK2, key, OPC and SMSP, or a combination thereof.

For security consideration, a security level of the SIMZone unit 24 may be equivalent to that of a traditional SIM card. Since the personalization data storage unit 245 is not exposed to the external, thus, the security of the personalization data can be ensured through a secure calculation function of the COS and a secure communication function of the second protocol interface 244.

In one embodiment of the present disclosure, the IF1 interface may be a COS programming interface or a personalization data writing interface. When the IF1 interface is the COS programming interface, the COS programming interface is connected to the COS programmer, i.e., the second protocol interface 244 is connected to the COS programmer through the COS programming interface, so as to enable the COS programmer to program the COS storage unit 242. When the IF1 interface is the personalization data writing interface, the personalization data writing interface is connected to the personalization data writing device (also called as card writer), i.e., the second protocol interface 244 is connected to the personalization data writing device through the personalization data writing interface, so as to enable the personalization data writing device to write the personalization data into the personalization data storage unit 245.

Further, a hardware circuit of the IF1 interface includes a power supply (VCC), a grounded end (GND), a resetting end (RESET), a programming voltage (VPP), a clock (CLK) and a data input/output (I/O).

After the COS storage unit 242 is programmed using the COS programming interface of the IF1 interface, the data stored in the COS storage unit 242 cannot be erased or amended because the COS storage unit 242 is a one-time programmable unit, so as to prevent the COS from being tampered. When desiring to modify the personalization data storage in the SIMZone unit 24, the personalization data writing interface of the IF1 interface is used, so as to interact with the COS, and the procedure will not be particularly defined herein. It should be appreciated that, in order to ensure the security of the personalization data, the personalization data storage unit 245 may be implemented using an Electrically Erasable Programmable Read-only Memory (EEPROM) technique or a FLASH technique.

In one embodiment of the present disclosure, because the SIMZone unit 24 is integrated into the communication chip, thus, the SIMZone unit 24 is needed to be manufactured using a process identical to the baseband CPU 21, the selector switch 23 and the other unit 25, e.g., a 0.13 μm or 65 nm process. Due to limitations in the related art, the design methods for the SIMZone unit 24 are different from each other in different processes. To be specific, the RAM 241. the MCU 243 and the second protocol interface 244 may be manufactured using a process identical to the baseband CPU 21 and the other unit 25 in the communication chip. The COS storage unit 242 may be manufactured using a one-time programmable (OTP) logic technique or any other process. The personalization data storage unit 245 is usually manufactured using a 90 nm or 0.13 μm process, so as to support EEPROM or FLASH. When the personalization data storage unit 245 is implemented as the EEPROM or FLASH, the entire communication chip can merely be manufacturing using a corresponding process.

The methods for manufacturing the SIMZone unit 24 of the communication chip in different conditions will be described hereinafter.

(1) When the communication chip is manufactured using a 65 nm, 55 nm, 40 nm process or less. RAM 241, MCU 243 and the second protocol interface 244 are implemented using a digital technique, the COS storage unit 242 is implemented using an OTP ROM technique, and the personalization data storage unit 245 is implemented using an MTP logic. When the technology is so advanced as to enable embedding EEPROM or FLASH into the communication chip, the personalization data storage unit 245 may use EEPROM or FLASH. Usually, MTP may be erased for about 10 times, so the personalization data may be updated for limited times. When EEPROM or FLASH is used as the personalization data storage unit 245, it may be erased for more than 100,000 times.

In accordance with a current protocol standard, when requiring for updating a cell for the communication between the baseband CPU 21 and the SIMZone unit 24, the baseband CPU 21 needs to write cell information into the SIMZone unit 24, However, since the SIMZone unit 24 is integrated into the communication chip, thus it is unnecessary to write the cell information into the SIMZone unit 24. In this case, even when the personalization data storage unit 245 is implemented using the MTP logic, there will be no any problems other than limited updating times for the personalization data, i.e., that the personalization data cannot be frequently written into the SIM card locally or over the air.

(2) When the communication chip is manufactured by a 0.13 μm process or more, the personalization data storage unit 245 may use EEPROM or FLASH, so that the personalization data may be updated for more than 100,000 times.

It should be appreciated that, when the SIMZone unit 24 is designed as mentioned above, it is able to ensure that its security level is not lower than the traditional SIM card. Moreover, the COS program codes are stored in the COS storage unit 242 and may easily be decompiled. In order to overcome this drawback, the COS storage unit 242 in one embodiment of the present disclosure may be implemented using a hardware logic, i.e., the COS program codes may be converted into Register Transfer Levels (RTLs) which are then stored in the COS storage unit 242.

In a word, in one embodiment of the present disclosure, the SIM card is integrated into the communication chip of the terminal equipment, and its security level is not lower than the traditional SIM card. As a result, it is able to reduce an area occupied by the SIM card on the PCB of the terminal equipment and prevent the use of the SIM card as a separate hardware entity, thereby avoiding the plugging of the SIM card and improving reliability and security, In addition, the COS storage unit is implemented using a hardware logic, so the COS program codes cannot be decompiled easily.

Through the above-mentioned description, it may be apparent for a person skilled in the art that the present disclosure may be implemented by hardware, or by software as well as a necessary common hardware platform. Based on this, the technical solutions of the present disclosure, or the portions thereof contributing to the related art, may appear in the form of software products, which may be stored in a storage medium and include several instructions so as to enable a computer equipment (personal computer, server or network equipment) to execute the methods according to the embodiments of the present disclosure.

It should be appreciated that, the drawings merely relate to the preferred embodiments of the present disclosure, and the modules or flows in the drawings are not always those necessary for the implementation of the present disclosure.

It should be further appreciated that, the modules may be arranged in the device as described in the embodiments or, after some changes, in one or more devices different from that according to the embodiments of the present disclosure. The modules may be combined into a single module, or may be further divided into a plurality of sub-modules.

Sequence numbers of the embodiments are only for description purposes and do not imply the superiority or inferiority of the embodiments.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A communication chip integrated with a subscriber identity module (SIM) card, comprising a baseband central processing unit (CPU), a first protocol interface, a selector switch and a SIMZone unit;
    wherein the baseband CPU is connected to the first protocol interface; the selector switch is connected to the SIMZone unit, the first protocol interface, and an IF1 interface, respectively;
    wherein the selector switch is in a state of communication with the SIMZone unit all the time; when the selector switch is in a state of communication with the first protocol interface, the SIMZone unit is configured to provide an SIM card functionality for the baseband CPU; when the selector switch is in a state of communication with the IF1 interface, the SIMZone unit is configured to receive data written from the IF1 interface.

2. The communication chip according to claim 1, wherein when the IF1interface is connected to a device of a specified type, the selector switch is in a state of communication with the IF1 interface, and the selector switch is not in a state of communication with the first protocol interface; when the IF1 interface is not connected to the device of the specified type, the selector switch is in a state of communication with the first protocol interface, and the selector switch is not in a state of communication with the IF1 interface.

3. The communication chip according to claim 2, wherein the device of the specified type is a chip operating system (COS) programmer or a personalization data writing device.

4. The communication chip according to claim 1, wherein the SIMZone unit comprises a random access memory (RAM), a COS storage unit, a micro-control unit (MCU), a second protocol interface and a personalization data storage unit;
    the RAM, the COS storage unit, the second protocol interface and the personalization data storage unit are connected to the MCU, respectively; the SIMZone unit is connected to the selector switch through the second protocol interface;
    the RAM is configured to store temporary data for running of the COS on the MCU;
    the COS storage unit is configured to store program codes of the COS;
    the MCU is configured to run the COS;
    the second protocol interface is configured to provide a communication function which enables the SIMZone unit to be in communication with the baseband CPU and a programming function which enables the programming of the COS storage unit and the writing of personalization data into the personalization data storage unit through the IF1 interface; and
    the personalization data storage unit is configured to store the personalization data.

5. The communication chip according to claim 4, wherein in a second-generation (2G) network, the personalization data comprises one of International Mobile Subscriber. Identity (IMSI), Integrate Circuit Card Identity (ICCID), personal identity numbers (PIN1, PIN2), PIN Unlocking Keys (PUK1, PUK2), Key Identifier (KI) and Short Message Service Platform (SMSP), or a combination thereof; and
    in a third-generation (3G) network, the personalization data comprises one of IMSI, ICCID, PIN1, PIN2, PUK1, PUK2, key (K), Operator Key (OPC) and SMSP, or a combination thereof.

6. The communication chip according to claim 4, wherein the first protocol interface is a protocol interface based on a smart card international standard ISO7816; and the second protocol interface is a protocol interface based on the smart card international standard ISO7816.

7. The communication chip according to claim 4, wherein the IF1interface is a COS programming interface or a personalization data writing interface;
    when the IF1 interface is the COS programming interface, the second protocol interface is connected to the COS programmer through the COS programming interface, so as to enable the COS programmer to program the COS storage unit; and
    when the IF1 interface is the personalization data writing interface, the second protocol interface is connected to a personalization data writing device through the personalization data writing interface, so as to enable the personalization data writing device to write the personalization data into the personalization data storage unit.

8. The communication chip according to claim 1, wherein a hardware circuit of the IF1 interface comprises a power supply (VCC), a grounded end (GND), a resetting end (RESET), a programming voltage (VPP), a clock (CLK) and a data input/output (I/O).

9. The communication chip according to claim 1, comprising a digital signal processor (DSP) and/or a communication chip peripheral interface.

* * * * *